(12) United States Patent
Karlen et al.

(10) Patent No.: US 11,458,570 B2
(45) Date of Patent: Oct. 4, 2022

(54) LEAN OPTIMIZED ADDITIVE MANUFACTURING PROCESS

(71) Applicant: Hamilton Sundstrand Corporation, Charlotte, NC (US)

(72) Inventors: Eric W. Karlen, Rockford, IL (US); Sergey Mironets, Charlotte, NC (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 414 days.

(21) Appl. No.: 16/371,713

(22) Filed: Apr. 1, 2019

(65) Prior Publication Data

US 2020/0306881 A1 Oct. 1, 2020

(51) Int. Cl.
| | | |
|---|---|---|
| *B23K 26/34* | (2014.01) | |
| *B33Y 10/00* | (2015.01) | |
| *B29C 64/147* | (2017.01) | |
| *B23K 26/342* | (2014.01) | |
| *B29C 64/20* | (2017.01) | |
| *B23K 26/324* | (2014.01) | |
| *B23K 26/36* | (2014.01) | |
| *B22F 12/40* | (2021.01) | |
| *B23K 26/26* | (2014.01) | |
| *B23K 26/00* | (2014.01) | |
| *B23P 17/00* | (2006.01) | |
| *B23K 26/323* | (2014.01) | |

(52) U.S. Cl.
CPC ............ *B23K 26/26* (2013.01); *B23K 26/009* (2013.01); *B23K 26/34* (2013.01); *B23K 26/342* (2015.10); *B23P 17/00* (2013.01); *B29C 64/147* (2017.08); *B29C 64/20* (2017.08); *B33Y 10/00* (2014.12); *B22F 12/40* (2021.01); *B23K 26/323* (2015.10); *B23K 26/324* (2013.01); *B23K 26/36* (2013.01)

(58) Field of Classification Search
CPC ...... B23K 26/26; B23K 26/34; B23K 26/323; B23K 26/324; B23K 26/36; B23K 26/362; B23K 20/06; B29C 64/20; B33Y 10/00; B32K 26/342; B22F 12/40; B23P 17/00
USPC .................................................... 219/121.64
See application file for complete search history.

(56) References Cited

U.S. PATENT DOCUMENTS

| | | | |
|---|---|---|---|
| 5,354,414 A | 10/1994 | Feygin | |
| 5,876,550 A * | 3/1999 | Feygin | ................... B29C 41/36 156/264 |
| 7,261,550 B2 | 8/2007 | Herzog | |
| 8,465,689 B2 | 6/2013 | Sperry et al. | |
| 9,925,723 B2 | 3/2018 | Mironets | |
| 2008/0083706 A1 | 4/2008 | Kirmeier | |
| 2009/0130449 A1 | 5/2009 | El-Siblani | |

(Continued)

FOREIGN PATENT DOCUMENTS

| | | |
|---|---|---|
| EP | 3437765 A1 | 2/2019 |
| WO | 9611117 A1 | 4/1996 |

OTHER PUBLICATIONS

Extended European search report issued in corresponding EP application No. 19212282.8, dated Jun. 16, 2020.

*Primary Examiner* — Sang Y Paik
*Assistant Examiner* — Erwin J Wunderlich
(74) *Attorney, Agent, or Firm* — Locke Lord LLP; Daniel J. Fiorello; Gabrielle L. Gelozin

(57) ABSTRACT

An additive manufacturing process is disclosed that involves positioning a metallic layer beneath a component substrate and welding the metallic layer to the component substrate using laser energy.

8 Claims, 3 Drawing Sheets

(56) References Cited

U.S. PATENT DOCUMENTS

| | | | |
|---|---|---|---|
| 2011/0000953 A1* | 1/2011 | Daehn | B23K 20/06 |
| | | | 228/115 |
| 2013/0015609 A1 | 1/2013 | Landau | |
| 2016/0279705 A1* | 9/2016 | Mironets | B33Y 30/00 |
| 2018/0088462 A1 | 3/2018 | Vyatskikh et al. | |
| 2018/0229332 A1 | 8/2018 | Tsai et al. | |
| 2018/0272464 A1* | 9/2018 | Bruck | B33Y 10/00 |
| 2019/0039183 A1 | 2/2019 | Morton et al. | |
| 2019/0061045 A1* | 2/2019 | Vivek | B32B 3/08 |

\* cited by examiner

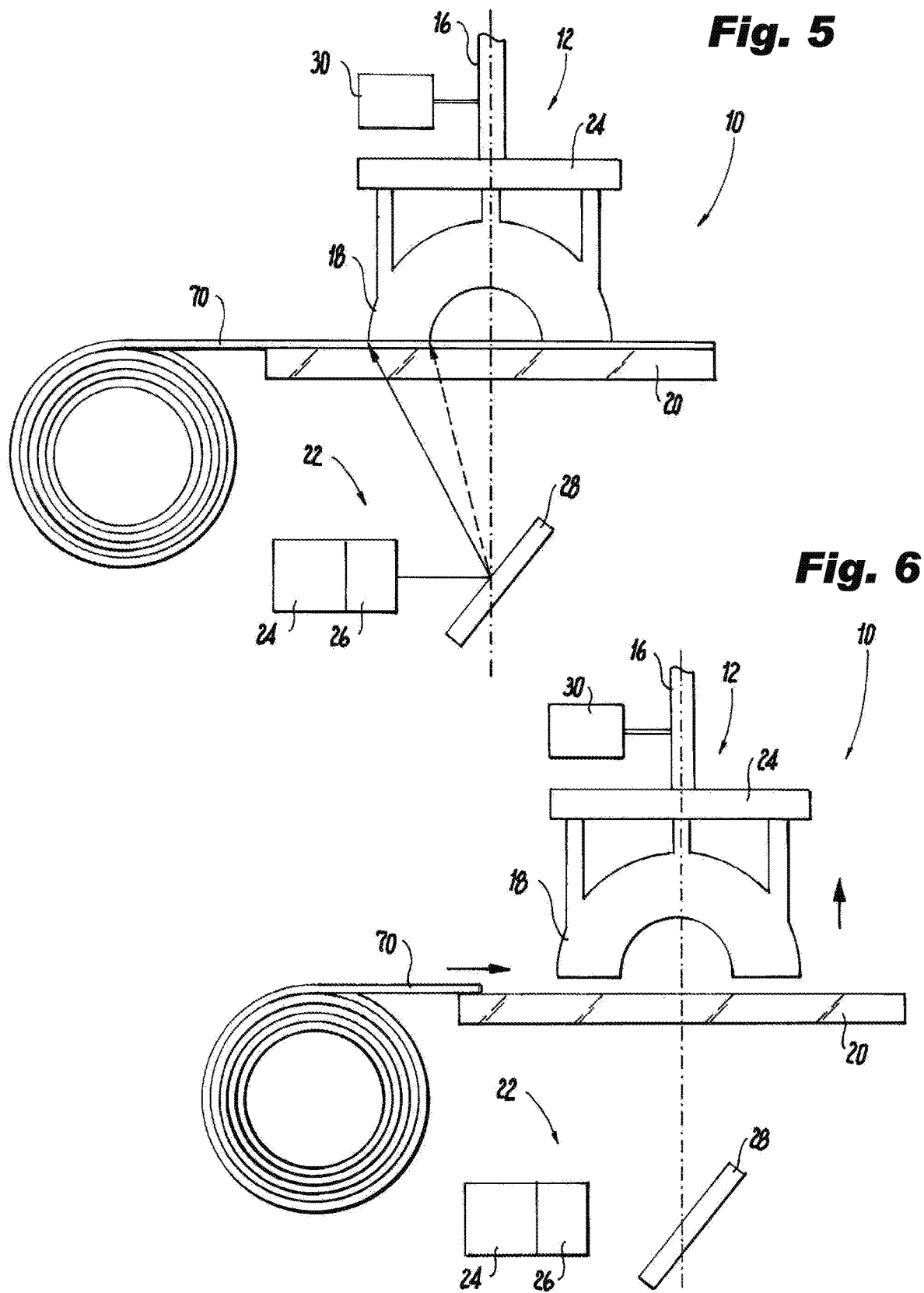

LEAN OPTIMIZED ADDITIVE MANUFACTURING PROCESS

BACKGROUND OF THE INVENTION

1. Field of the Invention

The subject invention is directed to additive manufacturing techniques, and more particularly to an additive manufacturing process that uses a metallic sheet or layer as the raw material source instead of a powder bed.

2. Description of Related Art

Additive manufacturing (AM) or additive layer manufacturing (ALM) processes are commonly used to fabricate structures by adding successive layers to an underlying substrate. AM and ALM processes typically involve charging a powder bed housing a substrate with powder and selectively fusing a portion of the powder as a layer to the substrate, generally with a heat source like a laser, e-beam, or welding device. Once the layer has been developed over the substrate, the substrate is withdrawn into the powder bed, the powder bed is re-charged with additional powder, and a successive layer is fused to the layer previously added to the substrate.

The powder generally includes a metal, ceramic, or plastic material of relatively fine consistency and which is readily deposited into the powder using a re-coater device. The re-coater device is typically a blade or roller type device that is operable to displace powder from the a powder source (i.e., a powder reservoir) to the powder bed where, upon delivery, the powder joins residual powder previously delivered to the powder bed and not fused to the underlying substrate when prior layer was added to the substrate. Once the final layer has been added to the structure, the structure is removed from the powder bed for subsequent processing.

Those skilled in the art will readily appreciate that the powder used for AM process is usually not uniform due to the inherent variation in particle size distribution, and the total surface area that exists within the powder is also extremely high, which has effects on material properties as oxygen content increases.

Thus, while the use of such conventional raw materials have generally been considered satisfactory for their intended purpose, there remains a need in the art for improved additive manufacturing techniques, which do not rely on a powder bed as the raw material source. The present disclosure provides a solution for this need.

SUMMARY OF THE DISCLOSURE

The subject invention is directed to a new and useful additive manufacturing process for fabricating structures, such as components used in aerospace systems, which includes the steps of positioning a metallic layer beneath a component substrate and welding the metallic layer to the component substrate.

The method further includes the step of providing a support surface beneath the metallic layer, which is preferably a light permeable support substrate. In this regard, the light permeable support substrate may be formed from a translucent or transparent material, such as glass.

In one embodiment of the subject invention, the metallic layer is provided as a continuous sheet of metal. In such an embodiment, the step of welding the metallic layer to the component substrate involves using laser energy to promote fusion welding between the metallic layer and the component substrate.

In another embodiment of the invention, the metallic layer is deposited on a non-metallic substrate. In such an embodiment, the step of welding the metallic layer to the component substrate involves using laser energy to ablate the non-metallic substrate and propel the metallic layer towards the component substrate to create a weld joint.

The additive manufacturing process of the subject invention further includes the steps of moving the component substrate away from the support surface after the metallic layer has been welded to the component substrate, positioning a subsequent metallic layer on the support surface beneath the component substrate, moving the component substrate toward the subsequent metallic layer on the support surface, and welding the subsequent metallic layer to the component substrate. When the process involves a continuous sheet of metal, the step of positioning a subsequent metallic layer on the support surface beneath the component substrate involves advancing the continuous sheet of metal relative to the support surface.

The subject invention is also directed to an additive manufacturing process that includes the steps of depositing a metallic layer on a non-metallic substrate, positioning the metallic layer beneath a component substrate, and welding the metallic layer to the component substrate. Preferably, the step of welding the metallic layer to the component substrate involves using laser energy to ablate the non-metallic substrate and propel the metallic layer towards the component substrate to create a weld joint.

The subject invention is also directed to an additive manufacturing process that includes the steps of providing a continuous sheet of metal, positioning a section of the sheet beneath a component substrate, welding at least a portion of the section to the component substrate, and advancing the sheet relative to the component substrate so as to position a subsequent section of the sheet beneath the component substrate for welding. Preferably, the step of welding at least a portion of the section of the sheet to the component substrate involves using laser energy to promote fusion welding between the sheet and the component substrate. The method can include cutting around the welded portion to release the welded portion from the continuous sheet of metal. Cutting can include laser cutting, for example.

These and other features of the additive manufacturing process of the subject invention will become more readily apparent to those having ordinary skill in the art to which the subject invention appertains from the detailed description of the preferred embodiments taken in conjunction with the following brief description of the drawings.

BRIEF DESCRIPTION OF THE DRAWINGS

So that those having ordinary skill in the art will readily understand how to make and use the subject invention without undue experimentation, preferred embodiments thereof will be described in detail herein below with reference to the figures wherein:

FIG. 5 is a top plan view of a metallic layer deposited or otherwise coated on a non-metallic substrate for use with the additive manufacturing system illustrated in FIG. 1; and FIG. 6 is a top plan view of a non-metallic sheet coated with a metal layer having a specific geometric shape corresponding to the component substrate for use with the additive manufacturing system illustrated in FIG. 1.

DETAILED DESCRIPTION OF THE PREFERRED EMBODIMENTS

Figure 1:
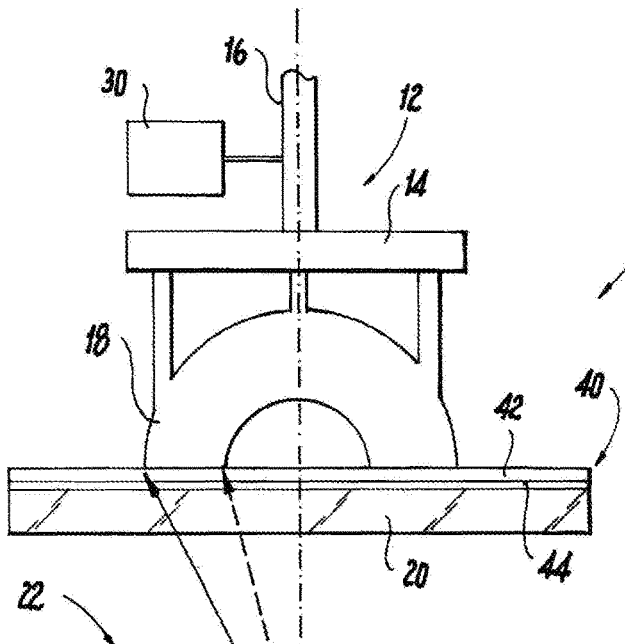
FIG. 1 is a schematic view of a system utilized to perform an embodiment of the additive manufacturing process of the subject invention, which involves welding a metallic layer deposited on a non-metallic substrate to a component substrate through ablation of the non-metallic substrate by way of laser energy.

Referring now to the drawings wherein like reference numerals identify similar structural features or elements of the subject invention, there is illustrated in FIG. 1 a system utilized to perform the embodiments of the additive manufacturing process of the subject invention, which is designated generally by reference numeral 10.

The additive manufacturing system 10 of the subject invention is of the type that is disclosed for example in commonly assigned U.S. Patent Application Publication 2016/0279705, the disclosure of which is herein incorporated by reference in its entirety. Those skilled in the art will readily appreciate that the unique methods and techniques described herein are particularly useful for fabricating parts and components that can be used in aerospace applications, such as, for example, fuel nozzles and gas turbine engine blades and vanes.

Referring now to FIG. 1, the additive manufacturing system 10 includes a build platform 12 having a build plate 14 that is mounted on a vertical shaft 16. The build plate 14 serves as a substrate for successively added layers of an additively manufactured component substrate 18. The component substrate 18 that is illustrated and described herein is simply an illustrative example of a component geometry, and should not be viewed in any way as a limitation on the subject disclosure.

The build plate 14 is configured to move along a vertical axis defined by the shaft 16 relative to a support substrate or surface 20 that is located below the build plate 14. The support substrate 20 is preferably formed from a light permeable material. More particularly, the support substrate 20 may be formed from a translucent or transparent material such as, for example, glass or the like.

The system 10 further includes an illuminator assembly 22 that includes a laser energy source 24, a focus element 26 and a scanning mirror 28. Focus element 26 is optically coupled to the laser energy source 24 along the beam path for focusing or defocusing radiation at a location disposed between the support substrate 20 and the build plate 14. The scanning mirror 28 is disposed along the beam path for selectively displacing the beam path laterally across a bottom surface of component substrate 18. As mentioned above, support substrate 20 is translucent or transparent, and thus radiation emitted by illuminator assembly 22 can pass therethrough to the component substrate 18.

As described for example in commonly assigned U.S. Patent Application Publication 2016/0279705, the build platform 12 and the illuminator assembly 22 are operatively connected to a communication bus, and a processor causes the build platform 12 and the illuminator assembly 22 to undertake certain actions or movements during an additive manufacturing process to achieve a desired result. More particularly, an indexer 30 is operatively coupled to build platform 12 for displacing build plate 14 (and component 18) upwards and downwards relative to the support surface 20 along a vertical axis of the shaft 16. The indexer 30 can include a motor and gear arrangement or a similar mechanism that is suitable to move the build plate 14 towards and away from the support surface 20 during an additive manufacturing process, as described in more detail below.

With continuing reference to FIG. 1, in an embodiment of the invention, the raw material for the additive manufacturing process disclosed herein is provided by way of an individual thin sheet 40 of raw material that includes a metallic layer 42 deposited or coated on a non-metallic substrate 44. The non-metallic substrate is preferably selected from a group of materials that remain stable across a wide range of temperatures, e.g., from −269 to +400° C. (−452 to 752° F.; 4 to 673 K). One example would be Kapton, which is a polyimide film developed by DuPont. Other similar materials could also be used as a non-metallic substrate.

Figure 3:
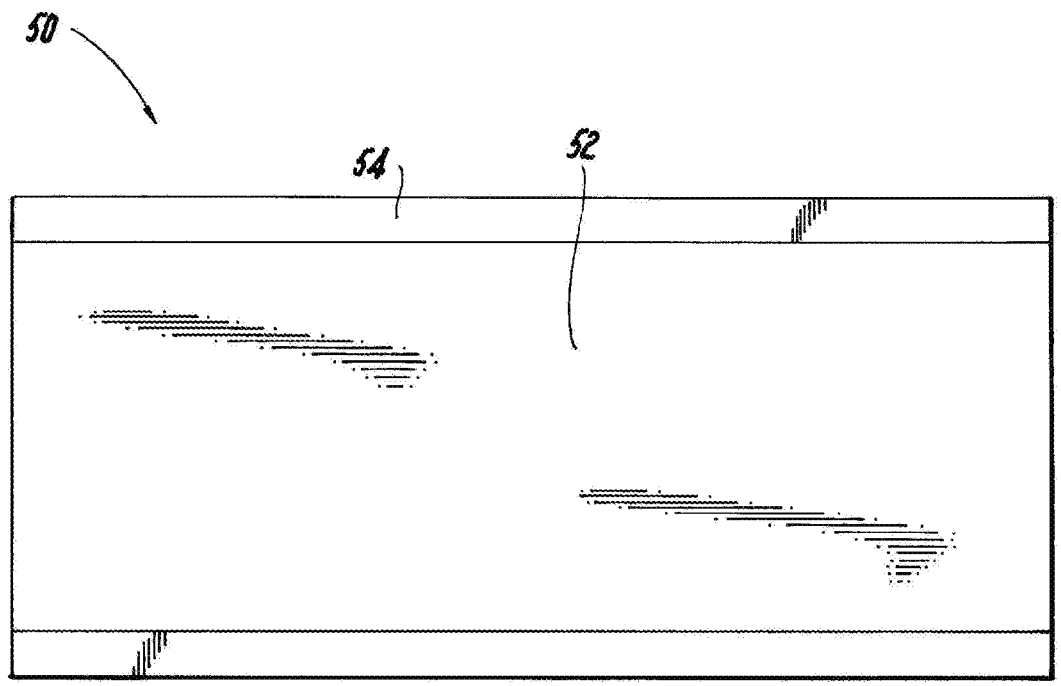
FIG. 3 is a schematic view of a system utilized to perform another embodiment of the additive manufacturing process of the subject invention, which involves a continuous sheet of metal configured to be progressively welded directly to the component substrate using laser energy to form a fusion weld.

It is envisioned that the individual sheets of raw additive material could be configured in a variety of ways to achieve a particular result relative to the manufacturing process being employed and the component part being fabricated. For example, as shown in FIG. 3, the raw material sheet 50 can include a metallic layer 52 deposited over substantially the entire surface area of the non-metallic substrate 54. Consequently, additional processing steps (e.g., laser cutting) may be required to cut around the welded structure to ensure its removal from the sheet 50.

Figure 4:
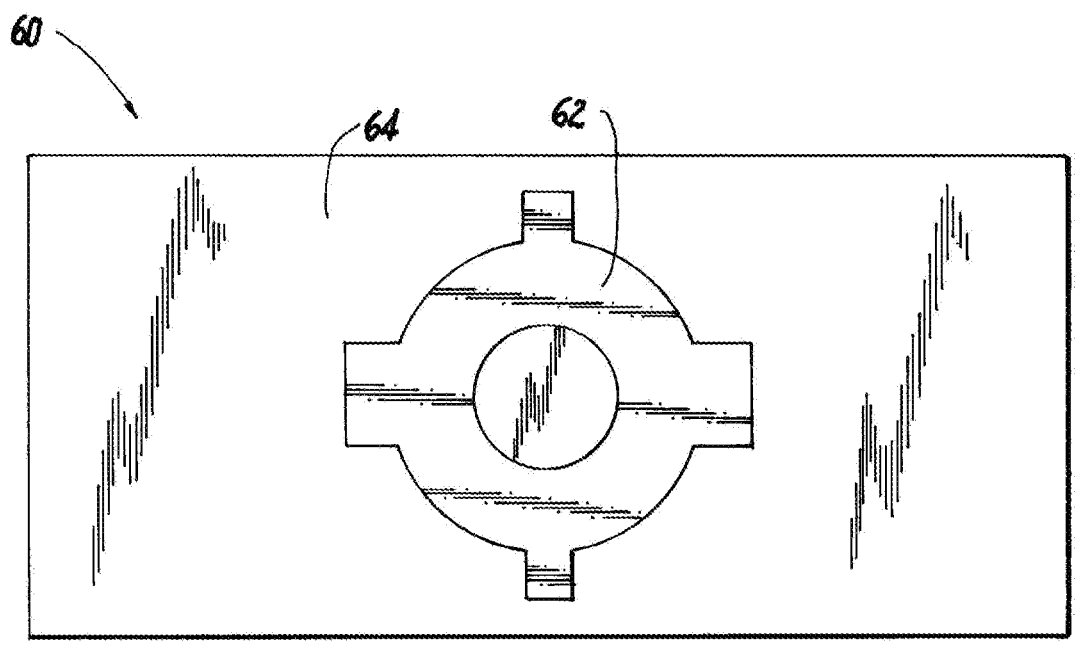
FIG. 4 illustrates the system shown in FIG. 2, wherein the component substrate is moved away from the support surface to advance another section of the continuous sheet of metal beneath the component substrate for welding.

Alternatively, as shown in FIG. 4, the individual raw material sheet 60 includes a metallic layer 64 having a specific pre-defined geometry that is representative of a component part, which is deposited or otherwise coated on the non-metallic substrate 64. This configuration of raw material sheet has the advantage of minimizing the amount of metal that is used so as to promote a lean manufacturing process.

With continuing reference to FIG. 1, in accordance with an embodiment of the subject invention, the method includes the step of welding the metallic layer 42 of sheet 40 to the component substrate 18 using laser energy from the illuminator assembly 22 to ablate the non-metallic substrate 44 and propel the metallic layer 42 towards the component substrate 18 to create a semi-solid state weld joint. More particular, as illustrated in FIG. 1, radiation emitted by the energy source 24 passes through the support substrate 20 as scanning mirror 28 selectively displaces the beam path laterally across a bottom surface of component substrate 18, so as to weld the metallic layer 42 to the component structure 18.

Figure 2:
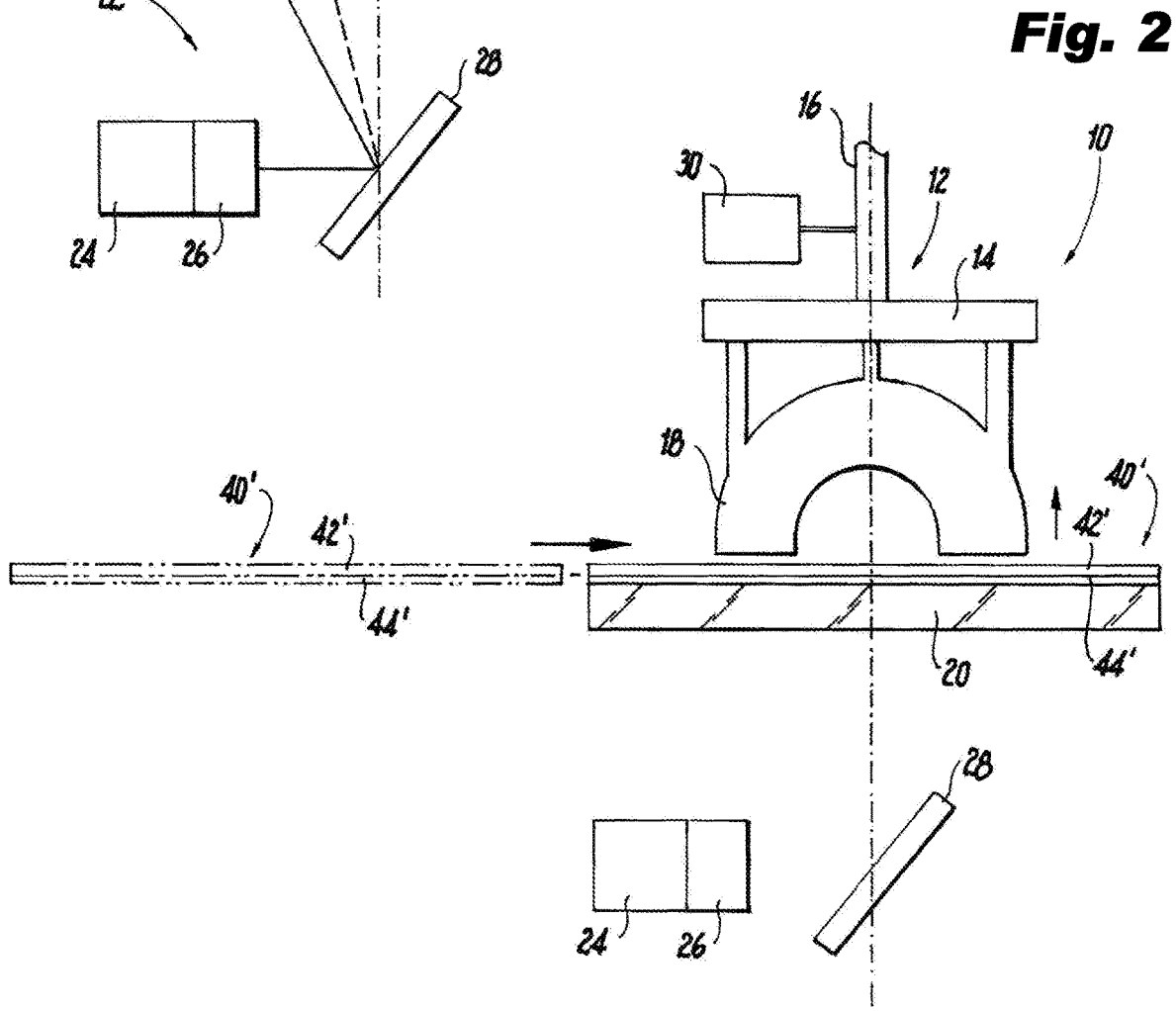
FIG. 2 illustrates the system shown in FIG. 1, wherein the component substrate is moved away from the support surface to position a subsequent metallic layer deposited on a non-metallic substrate beneath the component substrate.

The additive manufacturing process of the subject invention further includes the steps of moving the component substrate 18 upwardly away from the support surface 20 after the metallic layer 42 of sheet 40 has been welded to the component substrate 18, as shown in FIG. 2. This is done by operation of the indexer 30, which lifts the build plate 40 along the vertical axis defined by shaft 60. The vertical distance the indexer 30 translates component 18 should be minimized.

Moreover, the vertical distance should be enough to provide a sufficient overhead clearance for positioning a subsequent raw material sheet 40' (having metallic layer 42' deposited on non-metallic substrate 44') on the support surface 20 beneath the component substrate 18. Thereafter, indexer 30 will move the build plate 14 and component substrate 18 downwardly toward the support surface 20, so that the metallic layer 42' can be additively welded to the component substrate 18.

Referring now to FIGS. 5 and 6, in another embodiment of the subject invention, the raw material for the additive manufacturing process is provided as a continuous sheet of metal, which is designated generally by reference numeral 70. It is envisioned that the continuous sheet of metal 70 would have a thickness in the range of approximately 0.002" (50 microns) to approximately 0.003" (75 microns). Those skilled in the art will readily appreciate that the layer thickness can be adjusted to maximize either process speed or part resolution/surface roughness.

In this embodiment of the invention, the targeted layer or localized portion of the continuous metal sheet 70 would be welded directly to the additive part or component substrate 18. More particularly, laser energy from illuminator assembly 22 is used to promote fusion welding between the section of metallic layer provided by the continuous sheet 70 and the component substrate 18. And, the step of positioning a subsequent section of the metallic layer on the support surface 20 beneath the component substrate 18 involves advancing the continuous sheet of metal 70 relative to the support surface 20, as shown in FIG. 6.

It is envisioned that the continuous sheet of metal 70 would be maintained in a spool supported on a stand (not shown) and it would be mechanically advanced by way of a mechanism that would be operatively associated with the communication bus and processor with which the build platform 20 and illuminator assembly 22 are associated.

With continuing reference to FIG. 6, the manufacturing process also involves the step of moving the build plate 14 of platform 12 and thus the component substrate 18 upwardly away from the support surface 20 to provide sufficient clearance or headroom to advance the continuous sheet of metal 70 relative to the support surface 20. Then, the process involves moving the component substrate 18 back down towards the subsequent metallic layer of the sheet 70 on the support surface 20 for additively welding the subsequent metallic layer of the sheet 70 to the component substrate 18. This would be repeated continuously until the fabrication of the component 18 is completed.

Those skilled in the art will readily appreciate that the use of a raw material in the form of individual or continuous sheets of metal effectively eliminates the need for a metallic powder in the additive manufacturing process, which reduces the risk of environmental, health and safety hazards. Defects created by using metal powder are eliminated, such as, but not limited to, the expulsion of powder from the bed. The additive manufacturing processes disclosed herein also eliminate the need to remove excess powder from complex parts, which can be labor intensive.

While the subject disclosure has been shown and described with reference to preferred embodiments, those skilled in the art will readily appreciate that changes and/or modifications may be made thereto without departing from the scope of the subject disclosure.

What is claimed is:

1. An additive manufacturing process, comprising:
   a) positioning, as a continuous sheet of metal, a metallic layer deposited on a non-metallic substrate beneath a component substrate;
   b) welding the metallic layer to the component substrate; and
   c) providing a light permeable support surface beneath the metallic layer,
   wherein welding the metallic layer to the component substrate involves using laser energy to ablate the non-metallic substrate and propel the metallic layer towards the component substrate to create a weld joint, wherein the continuous sheet of metal is used as a raw material source in the additive manufacturing process.

2. The additive manufacturing process according to claim 1, wherein welding the metallic layer to the component substrate involves using laser energy to promote fusion welding between the metallic layer and the component substrate.

3. The additive manufacturing process according to claim 1, further comprising moving the component substrate away from the support surface after the metallic layer has been welded to the component substrate.

4. The additive manufacturing process according to claim 3, further comprising positioning a subsequent metallic layer on the support surface beneath the component substrate.

5. The additive manufacturing process according to claim 4, further comprising moving the component substrate toward the subsequent metallic layer on the support surface.

6. The additive manufacturing process according to claim 5, further comprising welding the subsequent metallic layer to the component substrate.

7. The additive manufacturing process according to claim 6, wherein positioning a subsequent metallic layer on the support surface beneath the component substrate involves advancing a continuous sheet of metal relative to the support surface.

8. An additive manufacturing process, comprising:
   a) depositing a metallic layer on a non-metallic substrate;
   b) positioning the metallic layer as a continuous sheet of metal beneath a component substrate; and
   c) welding the metallic layer to the component substrate, wherein welding the metallic layer to the component substrate involves using laser energy to ablate the non-metallic substrate and propel the metallic layer towards the component substrate to create a weld joint, wherein the continuous sheet of metal is used as a raw material source in the additive manufacturing process.

* * * * *